Patented Feb. 14, 1928.

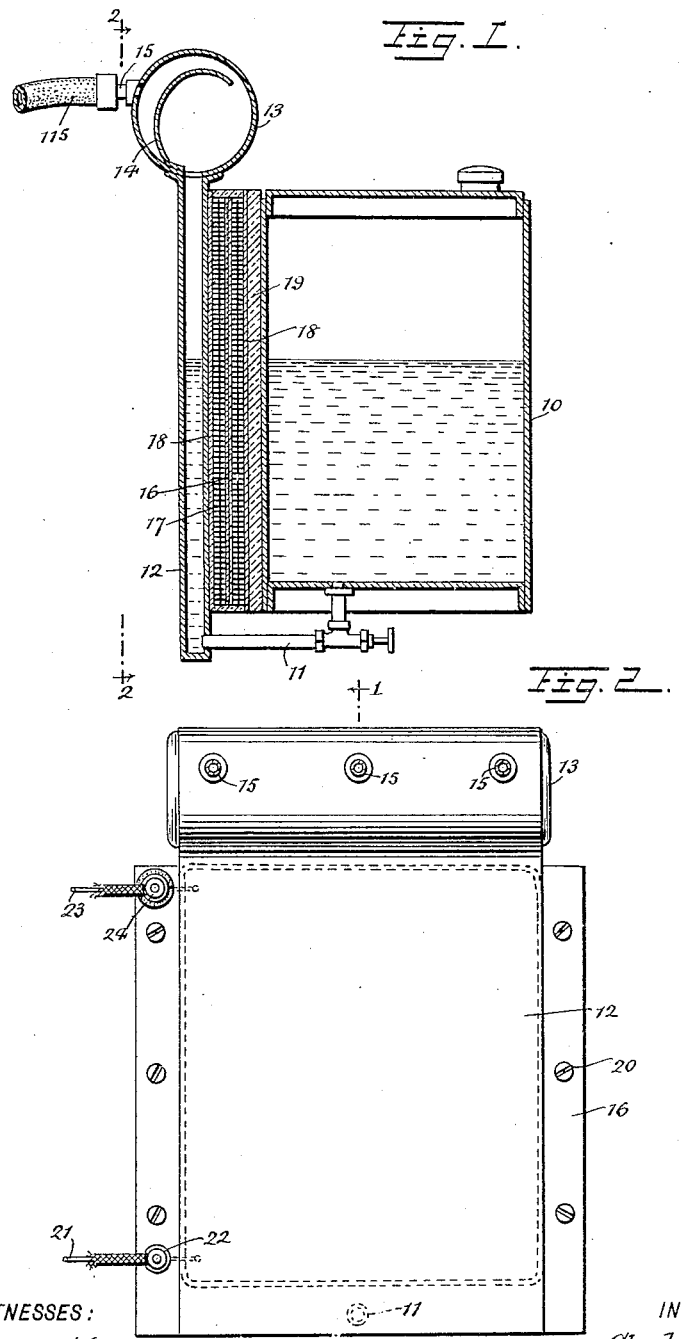

1,659,513

UNITED STATES PATENT OFFICE.

CHARLES B. BAUGHN, OF VISALIA, CALIFORNIA.

ELECTRICAL STEAM GENERATOR.

Application filed October 20, 1926. Serial No. 142,943.

My invention relates to a portable steam generator and is more particularly, in the preferred form of the invention, for furnishing steam quickly for the opening of storage batteries or for other purposes where steam is desired in a short period of time.

The general object of my invention is to provide a steam generator of the class described of simple construction and characterized by efficiency and reliability in operation.

The nature of my invention and its distinguishing features and advantages will clearly appear as the description proceeds.

Reference is to be had to the accompanying drawing forming a part of this specification, it being understood that the drawings are merely illustrative of one example of the invention.

Figure 1 is a transverse vertical section of an electrical steam generator embodying my invention, the section being indicated by the line 1—1 in Figure 2.

Figure 2 is an elevation of the steam generator with the discharge pipes in section in a plane indicated by the line 2—2 in Figure 1.

In carrying out my invention in accordance with the illustrated example, a water container 10 is provided and has a suitable connection 11, with a heating chamber 12 disposed vertically at a side of container 10. At the upper end of heating chamber 12 is a steam chamber in the form of a drum 13 having a curved baffle 14 within the same to prevent water from boiling over and into steam outlets 15, of which three are shown in illustrated form. In practice a convenient length of hose 115 is attached to each discharge outlet 15 for directing the steam rising in the chamber 13 to the three cells of a storage battery, for example.

Imposed against a face of the container 10, and between the same and heating chamber 12 is an electrical heating unit designated generally by the numeral 16 and consisting of electrical resistance wire 17 wound, for example, on sheet mica or equivalent material, and insulated on both sides with sheet mica 18 or the like. A slab of heat insulating material 19, of asbestos or equivalent is laid against container 10 between the same and electrical heating unit 16. The heating assemblage described is effective in applying heat to heating chamber 12 for generating steam. The heating unit is held in assembled condition by screws 20 fastened to sheet elements on said unit. Connected with the unit 16 is a conductor 21 which may be held by binding post 22 to be readily detachable in the usual manner, and also connected with the unit 16 is the second conductor wire 23, which is held to the heating unit 16 by solder or other soft metal that will melt at a lower temperature than the melting point of the metal of which water heating chamber 12 is made. The provision of the soft metal connection of the conductor 23 protects the apparatus against damage caused by overheating in case water container 10 should become dry while the current is on the electric heating unit 16. In the event water chamber 12 should become dry from any cause the solder or other soft metal connection at the binding post 24 of conductor 23 would automatically melt, thereby breaking the circuit.

It will be understood that any number of heating units 16 may be provided on the container 10 and disposed at one or more sides thereof, the unit shown being merely for the purpose of illustration.

I would state furthermore that while the illustrated example constitutes a practical embodiment of my invention, I do not limit myself strictly to the exact details herein illustrated, since, manifestly, the same can be considerably varied without departure from the spirit of the invention, as defined in the appended claims.

What I claim is:

1. An electrical steam generator including a water container, a heating chamber separate from the water container said chamber being adjacent said container at a side thereof and having connection therewith, and means disposed between the exterior surface of said container and the back of said water chamber for heating said chamber, together with a steam chamber on the heating chamber and provided with a steam outlet.

2. In an electrical steam generator, a water container, a water chamber in communication with said container, means to heat said water chamber, a separate steam chamber in communication with said water chamber, a steam chamber at the top of the heating chamber, a plurality of steam outlets on said chamber adapted to receive steam pipes for directing the steam to the desired points, and a baffle in said steam chamber adjacent to said steam outlets.

3. In an electrical steam generator, a water container, a steam generating chamber in communication with said container, an electric heating unit juxtaposed to said generating chamber, and conductors connected with said heating unit, at least one of said conductors being held adjacent said steam generating chamber by a metal melting at a low temperature, for causing an automatic breaking of the electric circuit upon overheating of said generating chamber.

CHARLES B. BAUGHN.